(12) United States Patent
Wood

(10) Patent No.: US 6,354,330 B1
(45) Date of Patent: Mar. 12, 2002

(54) LINING OF PIPELINES WITH A FLEXIBLE LINING INCLUDING A HEAT CURABLE RESIN BY CURLING IN STAGES

(75) Inventor: Eric Wood, deceased, late of Peel (GB), by Miranda Jane Bull, administrator of the estate

(73) Assignee: Insituform (Netherlands) B.V. (NL)

( * ) Notice: Subject to any disclaimer, the term of this patent is extended or adjusted under 35 U.S.C. 154(b) by 0 days.

(21) Appl. No.: 08/382,018

(22) PCT Filed: Mar. 8, 1994

(86) PCT No.: PCT/GB94/00443

§ 371 Date: Mar. 10, 1995

§ 102(e) Date: Mar. 10, 1995

(87) PCT Pub. No.: WO94/29098

PCT Pub. Date: Dec. 22, 1994

(30) Foreign Application Priority Data

Jun. 12, 1993 (GB) .............................................. 9312190

(51) Int. Cl.⁷ .......................... F16L 55/18; B29C 63/34
(52) U.S. Cl. ......................... 138/97; 138/98; 264/269; 156/287
(58) Field of Search ................. 138/97, 98, DIG. 7, 138/93; 156/287; 264/269, 36; 405/150.1

(56) References Cited

U.S. PATENT DOCUMENTS

| | | | |
|---|---|---|---|
| 4,009,063 A | * 2/1977 | Wood | 156/71 |
| 4,064,211 A | 12/1977 | Wood | 264/95 |
| 4,446,181 A | * 5/1984 | Wood | 428/36 |
| 4,867,921 A | * 9/1989 | Steketee, Jr. | 138/97 X |
| 5,034,180 A | * 7/1991 | Steketee, Jr. | 264/516 |
| 5,203,377 A | * 4/1993 | Harrington | 138/97 X |
| 5,213,727 A | * 5/1993 | Gargiulo | 138/97 X |
| 5,224,516 A | * 7/1993 | McGovern et al. | 138/97 |
| 5,372,162 A | * 12/1994 | Frey | 138/97 X |

FOREIGN PATENT DOCUMENTS

| | | |
|---|---|---|
| GB | 2018384 | 10/1979 |
| GB | 2208311 | 3/1989 |
| GB | 2260181 | 4/1993 |
| WO | WO9012241 | 10/1990 |

* cited by examiner

Primary Examiner—David Scherbel
Assistant Examiner—Patrick F. Brinson
(74) Attorney, Agent, or Firm—Cowan, Liebowitz & Latman, P.C.; Michael I. Wolfson; Lloyd G. Buchanan

(57) ABSTRACT

A method of lining an existing pipeline or passageway with a lining tube of a resin absorbent material impregnated with a curable synthetic resin is provided. A lining tube inserted into the pipeline and urged by pressure against the pipeline or passageway surface and heat is applied is stages to lengths of the lining tube by isolating a length of the uncured flexible lining from the remainder of the lining tube by expanding an expansible and contractible member inside the lining. A heated fluid medium is supplied to the isolated length so that the heat cures the resin within the isolated length. The contractible member is contracted and displaced along the length to isolate a new section of the lining tube which is then cured.

11 Claims, 3 Drawing Sheets

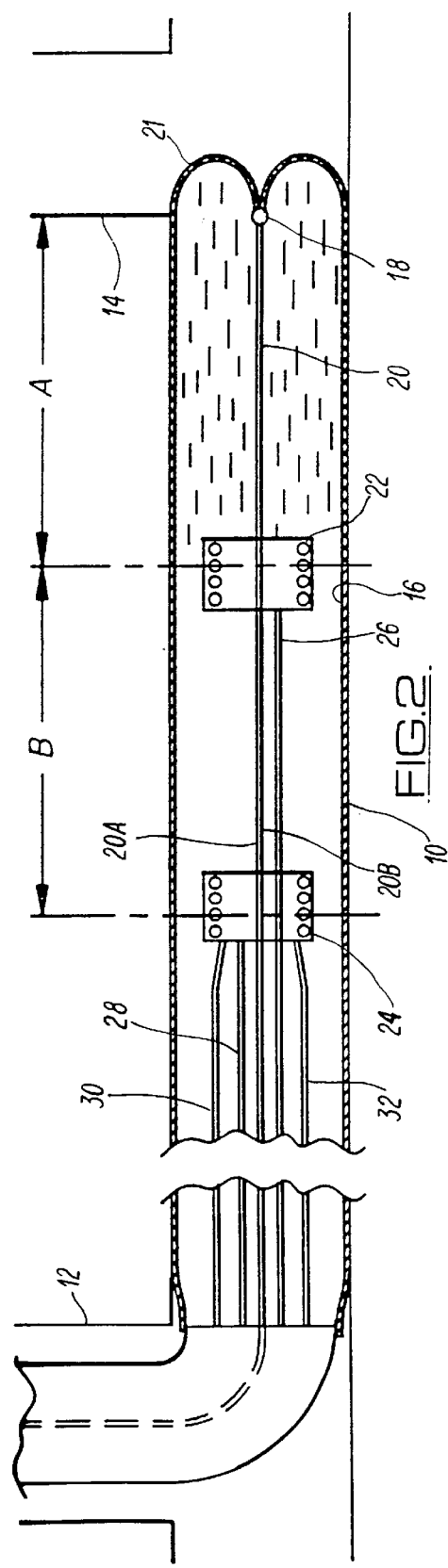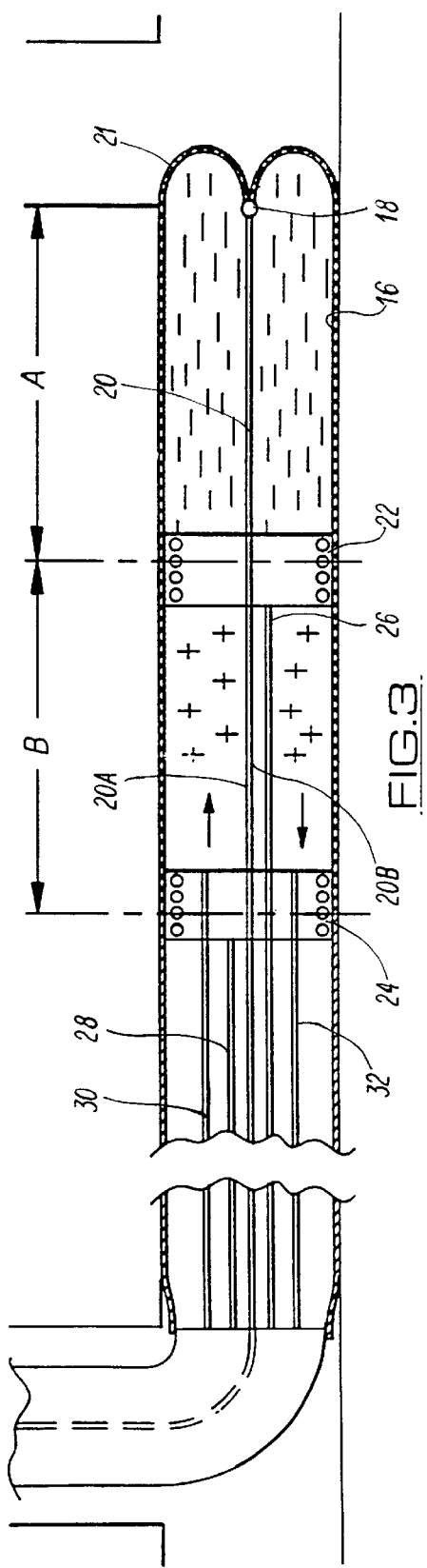

LINING OF PIPELINES WITH A FLEXIBLE LINING INCLUDING A HEAT CURABLE RESIN BY CURLING IN STAGES

This invention relates to the lining of pipelines and passageways especially but not exclusively underground pipelines or passageways by the so-called soft lining or cured in place method.

In this method, a tubular liner of resin absorbent material surrounded by a coating membrane or film of an impermeable material is soaked in a curable synthetic resin, and then the lining tube whilst still flexible i.e. the resin is uncured, is inflated by any suitable fluid medium such as air or water onto the underground pipeline or passageway surface. Whilst the lining tube is so held, the resin is cured or caused to cure so that it hardens into a substantially rigid pipe within the existing pipeline or passageway, the absorbent material being embedded in the cured resin. The process is used mainly for the relining of sewers; it provides first class rehabilitation of sewers and it has been tremendously successful.

An extremely effective pipelining construction results, and in fact the pipelining is carried this way throughout the world and to a considerable extent.

The examples of the method are disclosed in U.S. Pat. Nos. 4,009,063 and 4,064,211 which show that the lining tube may be inserted in the pipeline or passageway by any of several methods including an eversion method in which one end of the lining pipe is held at one end of the length of passageway to be lined, and the remainder of the lining tube is everted through the held end by a suitable fluid, usually water, in order simultaneously to apply the lining tube to the pipeline or passageway surface, and to hold it to such surface whilst curing takes place.

In an alternative method, referred to as pull in and inflate, the lining tube is simply inserted for example by pulling into the pipeline or passageway and then is inflated up to the pipeline or passageway surface by any suitable means such as an inflation tube which is everted into the inside of the lining tube.

A combination of these installation methods has been proposed and used in that two impregnated lining tubes may be used, a first of which is pulled into the pipeline or passageway and the second of which is everted into the first when it is inside the pipeline or passageway.

As to the method of curing the resin when the lining tube is in place, whilst other methods of curing resin have been proposed, such as curing by light radiation or by ultrasonics, by far the vast majority of cured in place lining work involves curing of the resin using heat. The most common resin which is used for impregnating the lining tube is polyester resin which is a heat cured thermosetting resin.

The present invention relates to improvements in soft lining processes wherein heat is used to cure the resin, and whilst the resin may typically be polyester resin, it is to be mentioned that any other heat cure resin may be employed.

In the known processes involving heat curing, it is ususal for the inflated lining tube to be filled with hot water in order to effect or at least initiate the cure. It should be mentioned that polyester resin is self curing once the initial curing reaction process has commenced, in that the reaction is exothermic which means that the curing of the resin in itself generates heat and that heat in turn enhances the curing rate.

As mentioned above, when curing by heat takes place, it is usual to fill the entire lining tube with hot water. As can be appreciated, especially in the case of pipelines or passageways of substantial diameter and/or length, large volumes of hot water must be provided, and this in itself represents a considerable problem. It is usual to provide the hot water from a supply vehicle such as a lorry or truck which is provided with a boiler and is connected to a supply of cold water. Heating of such a large volume of water takes a considerable length of time and costs a lot of money and this results in that completion of the lining operation is delayed due to the fact that a large volume of hot water must be brought up to temperature, and furthermore must be maintained at temperature in order to effect the cure, and the cost of the lining operation is increased. Because large volumes of water are involved, it is not possible to raise the temperature higher than a safe limit because of danger to personnel, and this again has a limiting effect on the speed of operation.

Where the lining tube is to be applied, as in the usual case to underground sewers, it is usual for the lining tubes to be applied during the night when the majority at least of the adjacent population will be asleep, so that there is minimum disruption. It is therefore of critical importance that the lining operation should be performed in as short a time as possible. When the lining tube has been applied it is therefore desirable that curing of the resin should be completed or at least initiated in as short a time as possible. The time can be reduced by using a fluid medium which is at a higher temperature, because generally the higher the fluid temperature, the greater the rate of curing, but there are temperature limitations for the reasons given above.

The present invention has an object to enhance the process whereby the curing time may be reduced, and curing can be effected in a particularly effective manner.

In accordance with the present invention there is provided a method of lining a pipeline or passageway wherein a lining tube comprising resin absorbent material which is impregnated with heat curable synthetic resin is urged by pressure against the pipeline or passageway surface, and heat is applied in stages to lengths of the lining tube by the following steps a) a first length is isolated from the remainder of the lining tube by expanding expansible and contractible means located inside the pipe, b) heated fluent medium is supplied to inside said first length so that the heat therein cures the resin in said first length, c) the expansible and contractible means is contracted and moved to a new position along the inside of the lining tube, d) the expandible and contractible means is expanded to isolate a second length of lining tube, e) heated fluent medium is supplied to inside said second length so that the heat therein cures the resins in said second length and f) if necessary, repeating the above steps for third and further lengths of the lining tube in order to complete the cure of the resin throughout the lining tube.

Preferably the resin is cured along the length of the tube in sections and in a sequence of operations comprising curing the resin of a first section or initiating the cure thereof, followed by curing of the resin of a next adjacent section, preferably of a similar length to the first section. By proceeding in this way an added advantage is obtained in that when polyester resin is cured it undergoes shrinkage and if a long length of tube is cured where the resin throughout the tube is cured at the same time, this shrinkage can cause a problem. If the resin is cured in short lengths however the uncured adjacent section can accommodate the shrinkage of the curing portions.

The means for performing the method may comprise sealing or blocking collars positioned in said lining tube at the ends of each section as it is cured, and the hot fluid heating medium, hot air, steam or water or a combination of these, can be circulated through the interior of the pipeline or passageway only in that section.

Where the lining tube is everted into the pipeline or passageway, only one of the blocking collars need be used during the curing of the first section, and in this connection a second blocking collar preferably is capable of collapse and expansion so that it can be expanded for the curing of the adjacent and subsequent sections.

Where the lining tube is everted into the pipeline or passageway, on the trailing end thereof there may be connected an eye or loop through which a hold-back rope passes, the hold-back rope serving on the one hand to control the rate of eversion of the length of tube as it is being put into the pipeline or passageway, and on the other hand serving as a means for supporting a pair of inflatable collars forming said blocking means, the collars being collapsed as the tube is everted into the pipeline or passageway, and these collars being attached to one length of the hold-back rope, the other length passing freely through the collars.

Connected to each collar there may be an inflation hose by which air under pressure can be supplied to the collars or withdrawn therefrom to expand and deflate the collars from ground level.

Additionally, circulation hoses may be connected to at least one of the collars and preferably that collar which is further from the trailing end of the lining when it has been fully everted.

By controlling the supply of air under pressure to the collars, and by feeding the hold-back rope around the eye or loop following complete eversion of the lining tube, so the collars can be positioned in sequence at different sections of the lining tube, and the collars can be selectively inflated and deflated to permit this movement to take place, to permit displacement of the fluid from the section between the collars, and to blank off the section between the collars so that heating fluid can be circulated only through this section by means of the circulation hoses.

It will be seen that the invention provides that heating of the lining tube for initiating or effecting cure of the resin can take place in controlled steps.

As a relatively small amount of heating fluid is used, it may be permissible to use heating fluid at a much higher temperature than heretofore and in any case it will be possible to heat that fluid up to that temperature quicker and by using smaller on site equipment, all of which is desirable. Indeed, the heating fluid may be super heated steam so that a very high temperature can be applied over the section of lining tube being cured. As soon as cure has been initiated and the lining tube is free standing over that section, the collars can be moved to the next section and the heating fluid circulated in the space therebetween to commence the cure of the next section.

It is believed that by performing the curing in this manner, the cure time can be considerably reduced especially if a medium at a much higher temperature can be used, and this will be of particular advantage in the curing of linings in large diameter and/or length pipes or passageways.

The spacing between the collars can be selected to suit the volume of hot fluid which can be supplied by the heating means, consistent with achieving a rapid rate of cure of the resin.

An embodiment of the present invention will now be described, by way of example, with reference to the accompanying diagrammatic drawings, wherein:

FIG. 2 shows an underground sewer to the surface of which between a pair of manholes has been applied a soft lining or cured in place lining by an eversion process; and FIGS. 3, 4 and 5 show the subsequent steps in the curing of the resin of the lining according to a sequence method according to the invention.

Figure 1:
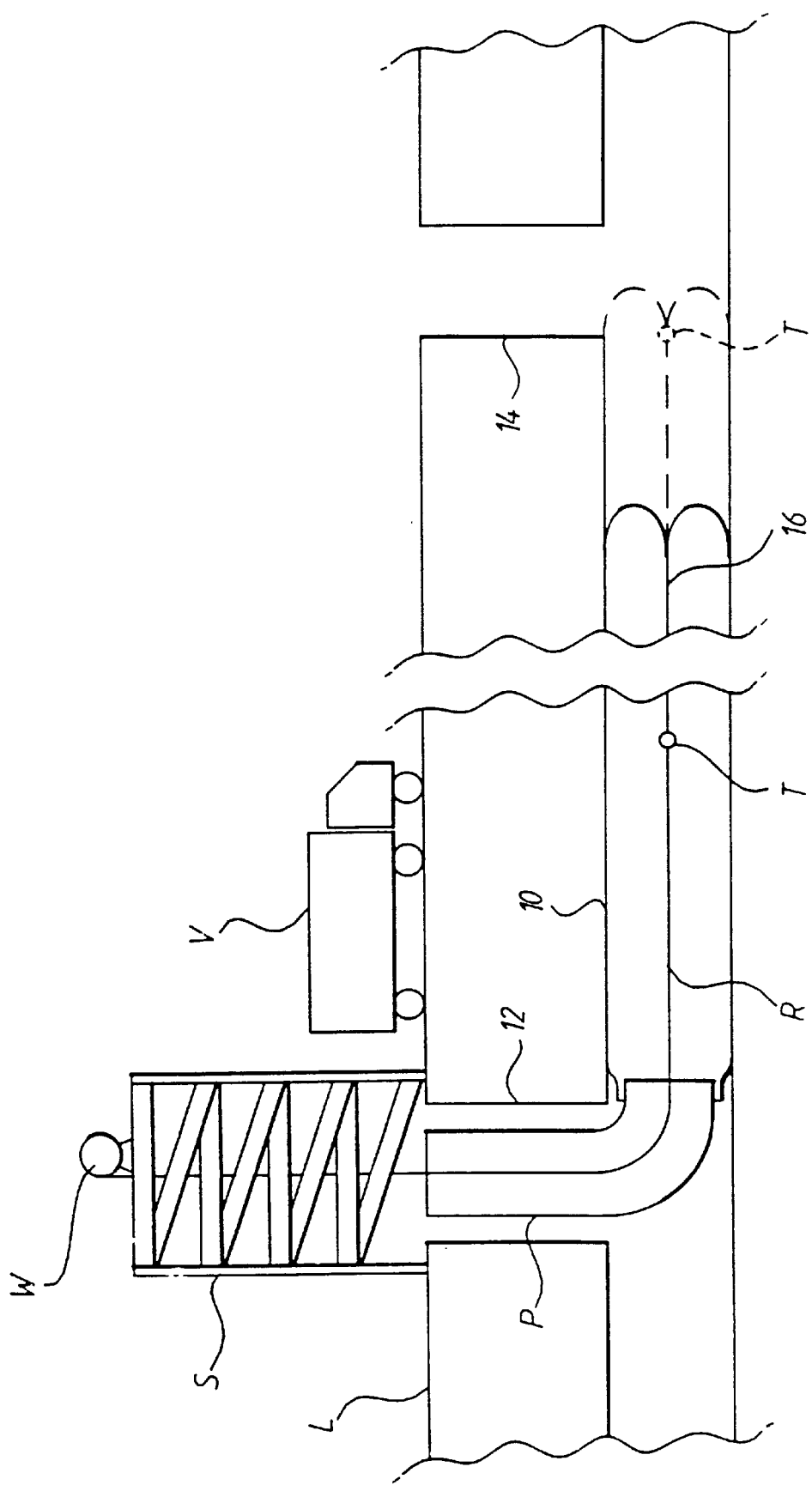
FIG. 1 shows in diagrammatic form how a resin impregnated tube is placed in position to line an underground sewer pipe by the eversion method.

FIG. 1 shows, in schematic form, the known process for applying a resin impregnated lining tube to the surface of an underground sewer. The sewer length to the lined is indicated by the reference 10 and it stands between two manholes 12, 14 open at ground level L. Inside the manhole 12 is an elbow pipe P. Initially the leading end of the tube 16 is fed down the pipe P and is everted so that said leading end can be connected to the lower end of the pipe P which faces the sewer 10 to be lined. Everting fluid, cold water, is charged into the top of the pipe P which has the effect of causing the tube 16 to evert into and along the sewer 10 as shown in FIG. 1 whereby the tube 16 is placed upon the sewer surface. At the trailing end T of the tube 16 a fitting 18 enables a hold back rope R to be connected.

Rope R is shown as being connected to a winch W at the top of a scaffold S used for the feeding of the tube 16 into pipe P. Scaffold S is not used in all cases, but generally the method described is well known and therefore only outline details are given here.

When the lining tube 16 has been fully placed in position, as shown in dotted lines in FIG. 1 the whole interior 9 the tube is filled with hot water, heated by a boiler unit in the service vehicle V provided as part of the on site equipment. The heat causes curing of the resin and when the resin is sufficiently cured, the lining tube becomes a free standing pipe lining the sewer 10.

U.S. Pat. Nos. 4,009,063 and 4,064,211 fully disclose soft lining or cured in place lining systems and indicate examples of lining tubes which can be utilised for these processes. Reference is made to these prior U.S. patents for particular details concerning the nature of the lining tube and the methods by which the lining tubes are installed in the pipeline or passageway. U.S. Pat. No. 4,446,181 discloses a particularly preferred form of lining tube.

Referring to FIG. 2, this shows the underground sewer pipe 10 extending between the pair of manholes 12 and 14. These manholes may be widely spaced e.g. in the order of 300 m, and the sewer pipe diameter may be in the order of 1.5 m.

The sewer pipe has been lined by a soft lining tube 16 by an eversion method, as described and as disclosed in more detail in U.S. Pat. No. 4,064,211 and it is shown in position when it has been fully everted. To the trailing end of the lining tube is provided an eye, loop or pulley 18 around which is looped a hold-back rope 20 which has two reaches 20A and 20B.

It should be explained that when the lining tube was being inserted, the hold-back rope reaches which extend to ground level are held, for example manually or by mechanical means and are fed out gradually so as to control the rate of eversion of the lining tube (see rope R in FIG. 1). It is important that eversion does not take place at too high a speed, as otherwise the closed trailing end 21 of the lining could be blown apart at the end of the eversion process. The hold-back rope reaches 20A, 20B prevent this.

The everting fluid for the lining 16 is water and cold water is used at this time because it is desirable that there should be no premature curing of the curable synthetic resin which impregnates and soaks the lining tube 16 which has resin absorbent layers, typically felt layers, to enhance this resin absorption.

The position shown in FIG. 2 is one in which the lining tube 16 has been fully everted, and steps now have to be taken in order to initiate effect the cure of the resin impregnating the lining tube, by means of heat.

Conventionally and as described, it would simply be a matter of circulating hot water through the interior of the entire lining tube, the hot water being applied by means of a hose which typically would be connected also to the trailing end of the lining tube, and may well be perforated to allow the hot water to circulate through the hose to the entire interior of the lining tube.

However, in accordance with the method of the present invention, the hold-back reaches carry two spaced inflatable collars 22 and 24 as shown. These collars are shown in the deflated condition in FIG. 2, but they can be selectively inflated up to the lining tube so as to sealingly engage same. The collar 24 is shown in FIG. 3 in the inflated condition. The collars can be selectively inflated via air pipes 26 and 28 which are respectively connected to collars 22 and 24, air pipe 26 passing sealingly and slidingly through collar 24.

Finally, circulation hoses 30 and 32 for supply and return of heating fluid are connected sealingly to collar 24 for the circulation of hot fluid medium as will be explained hereinafter.

When the lining tube is everted into position as shown in FIG. 2, the collars which are maintained spaced apart by a pre-determined distance (B) are also pulled into the interior of the lining but do not obstruct the introduction of the everting water. When the position shown in FIG. 2 has been reached, the collar 24 is inflated as shown in FIG. 3, thereby cutting off the section (B) of lining tube from the remainder. Hot water or steam or other heating fluid can now be circulated only into section (B) by circulating hot water from the ground level, the pipes 30 and 32 serving as a means for the supply and return of the heating fluid. The heating fluid can be at a much higher temperature than heretofore, because only a relatively small amount to fill section (B) is used.

As soon as the resin as indicated by cross hatching lines in FIG. 3 in section (B) has started to cure, the curing of the next section can commence. This is done by deflating collar 24 and by moving the two collars by pulling on reach 20A of the hold-back rope 20 to which the collars 22 and 24 are firmly attached, whilst allowing the reach 20B to be fed into the pipeline or passageway so that it can feed through the two collars 22 and 24 and the rope can pass round the pulley 20. The distance over which the collars 22 and 24 are displaced will be accurately controlled from ground level to ensure that the second section lies accurately adjacent the first section with no uncured sections therebetween.

Figure 4:
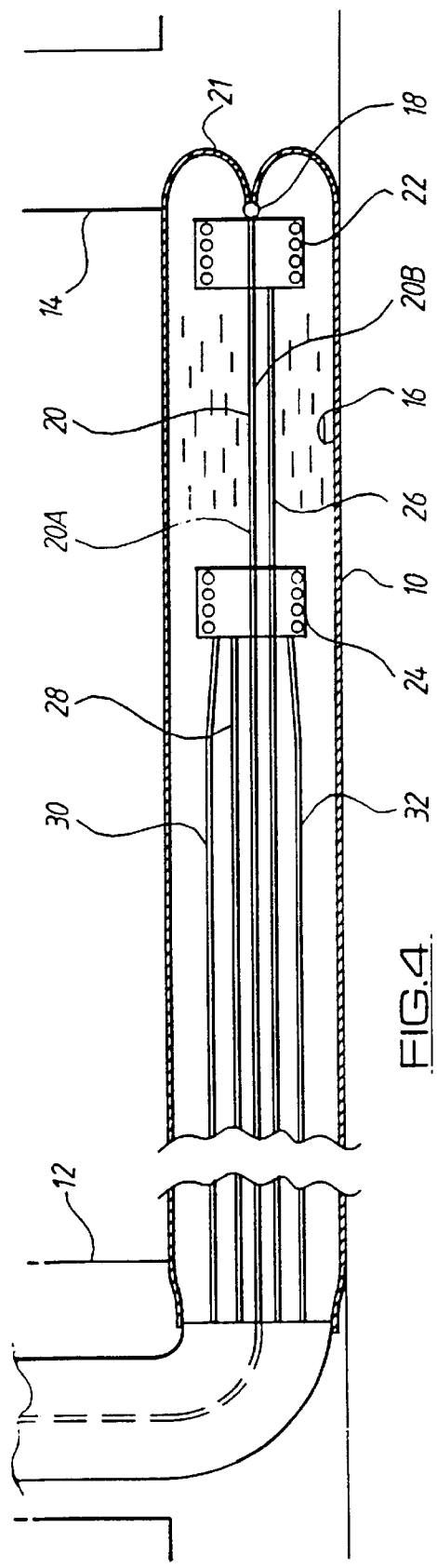
Figure 5:
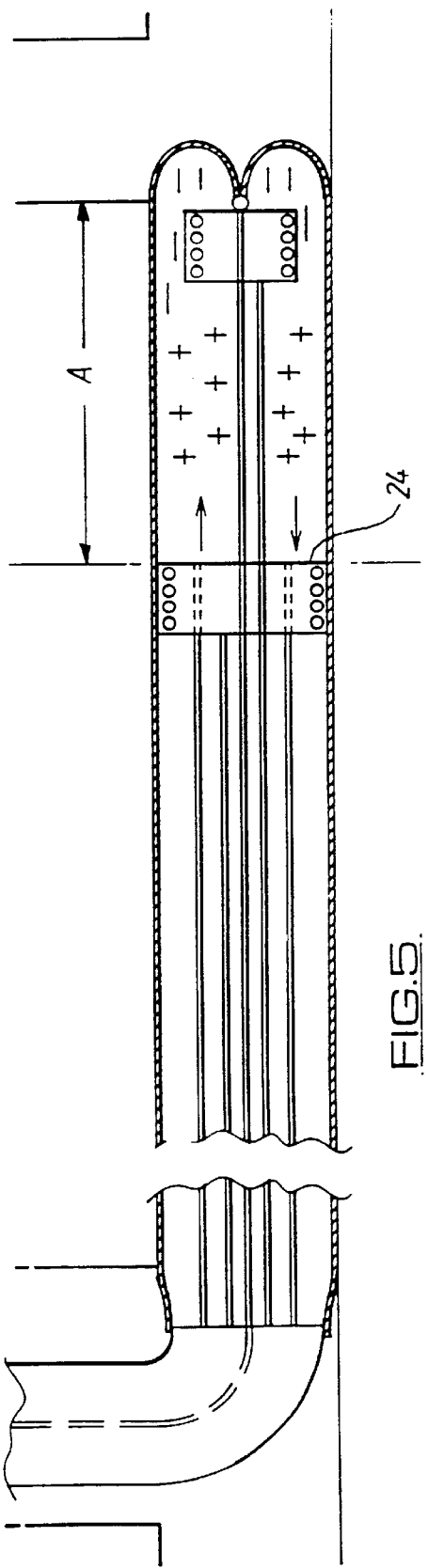

The collars are moved until they reach the position shown in FIG. 4. When the position shown in FIG. 4 has been reached, it is now a matter of inflating the collars 22 and 24 so that section (A) becomes isolated (as shown in FIG. 5) from the remainder of the interior of the lining tube, and the hot fluid can then be circulated via pipes 30 and 32 into the interior of the lining tube over section (A) and the resin in the lining tube on that section will then start to cure, as indicated by cross hatching lines in FIG. 5.

At the end of the period allowed for initiating cure in section (A), collars 22 and 24 are deflated, and the assembly is moved further back to a new section adjacent section (A) and the process is repeated. The process is repeated continuously until the entire lining tube has been cured or cure has been initiated.

It will be noted that once cure of one section has initiated, the exothermic effect of the curing of that resin section will tend to filter across to the next section to assist the cure of same. As in the example described, the curing starts from one end and progresses to the other end of the lining tube, so the shrinkage problems hereinbefore are avoided as the adjacent uncured section can absorb the shrinkage (small) of the curing section.

An enhanced and simplified process results, and this is of particular importance to soft lining applications involving the use of curing by heat, because the equipment required to produce the hot fluid medium can be smaller than heretofore and the fluid medium can therefore be elevated to a much higher curing temperature which gives rise to faster curing times.

What is claimed is:

1. A method of lining a pipeline or passageway wherein a lining tube of a resin absorbent material which is impregnated with curable synthetic resin and is urged by pressure against the pipeline or passageway surface, and heat is applied in stages to lengths of the lining tube, comprising:

a) inserting a flexible lining tube including a resin absorbent material impregnated with a curable resin into a pipeline to be lined, b) applying internal pressure to the lining tube to urge the lining tube against the interior of the pipeline;

c) isolating a first length of the uncured flexible lining, from the remainder of the lining tube by expanding expansible and contractible means located inside the lining, d) supplying a heated fluent medium to inside said first isolated length of flexible liner so that the heat therein cures the resin in said first length, e) contracting the expansible and contractible means, f) moving the expansible and contractible means to at least one new position at a further length along the inside of the lining tube, g) expanding the expandable and contractible means to isolate the at least one further length of lining tube, h) supplying heated fluent medium to inside said at least one further length so that the heat therein cures the resin in said further length, and i) removing the expandable and contractible means after the complete length of lining is cured.

2. The method according to claim 1, wherein the said pipeline or passageway is underground and the heated medium is supplied from ground level through pipes connected to said expansible and contractible means.

3. The method according to claim 2, wherein the heated medium is circulated from ground level through a supply pipe to the isolated lengths and is returned through a return pipe to ground level.

4. The method according to claim 3, wherein said heated medium is hot water.

5. The method according to claim 1, wherein said expansible and contractible means is inflatable for expansion of same and is deflatable for contraction of same.

6. The method according to claim 5, wherein the pipeline or passageway is located underground and the expansible and contractible means is expanded and contracted by contracting the supply of compressed air thereto from ground level.

7. The method according to claim 6, wherein said expansible and contractible means comprises a pair of inflatable collars connected to a pull rope means by which the collars can be pulled along the inside of the tube, said collars being connected to the pull rope means so as to be opened thereon when the pull rope means is pulled taught.

8. The method according to claim 7, wherein said pull rope means comprises a rope trained round a pulley fixed to the lining tube at one end thereof so as to define two reaches which extend from the pulley to the other end of the lining, one reach being connected to the expansible and contractible collars and the other reach extending slidably through the collars, and after the resin in each length of lining tube is cured, the collars are deflated and the collars are pulled by the rope to a new position.

9. The method of claim 1, wherein the step of inserting the flexible lining tube into the pipeline includes everting the lining tube through itself with an everting fluid.

10. The method of claim 1, wherein the step of inserting the flexible lining tube into the pipeline includes the step of pulling the lining tube into place in the pipeline and inflating the lining with an inflating medium which urges the lining against the interior of the pipeline.

11. The method of claim 10, including the step of inflating the tube by using an inflation tube which is everted through itself inside the lining tube to urge the lining tube against the interior of the pipeline.

* * * * *

UNITED STATES PATENT AND TRADEMARK OFFICE
CERTIFICATE OF CORRECTION

PATENT NO. : 6,354,330 B1
DATED : March 12, 2002
INVENTOR(S) : Eric Wood

It is certified that error appears in the above-identified patent and that said Letters Patent is hereby corrected as shown below:

<u>Title page,</u>
Item [54], should read:
-- [54] LINING OF PIPELINES WITH A FLEXIBLE LINING INCLUDING A HEAT CURABLE RESIN BY CURING IN STAGES --

Signed and Sealed this

Eleventh Day of June, 2002

Attest:

Attesting Officer

JAMES E. ROGAN
Director of the United States Patent and Trademark Office